(12) United States Patent
Donegan et al.

(10) Patent No.: US 11,474,893 B2
(45) Date of Patent: Oct. 18, 2022

(54) METHOD AND DEVICE FOR ASSESSING OVERALL ASSET CONDITION

(71) Applicant: Qualitrol Company LLC, Fairport, NY (US)

(72) Inventors: Paul Henry Stewart Donegan, Glasgow (GB); Emilio Morales Cruz, Belton, TX (US)

(73) Assignee: Qualitrol Company LLC, Fairport, NY (US)

( * ) Notice: Subject to any disclaimer, the term of this patent is extended or adjusted under 35 U.S.C. 154(b) by 355 days.

(21) Appl. No.: 16/711,224

(22) Filed: Dec. 11, 2019

(65) Prior Publication Data

US 2021/0182133 A1    Jun. 17, 2021

(51) Int. Cl.
    *G06F 11/07* (2006.01)
    *G06N 7/00* (2006.01)

(52) U.S. Cl.
    CPC ........ *G06F 11/079* (2013.01); *G06F 11/0721* (2013.01); *G06N 7/005* (2013.01)

(58) Field of Classification Search
    CPC ... G06F 11/079; G06F 11/0721; G06Q 50/06; G06Q 10/0635
    See application file for complete search history.

(56) References Cited

U.S. PATENT DOCUMENTS

| | | | |
|---|---|---|---|
| 2018/0174067 A1* | 6/2018 | Spiro | G06N 20/00 |
| 2018/0278055 A1* | 9/2018 | Shaik | G06Q 50/06 |
| 2019/0155712 A1* | 5/2019 | Tiwari | G06N 3/0427 |
| 2022/0011731 A1* | 1/2022 | Risbeck | F24F 11/64 |

OTHER PUBLICATIONS

International Search Report and Written Opinion for International Application No. PCT/US2020/063834, dated Jan. 26, 2021, 13 pages.

* cited by examiner

*Primary Examiner* — Nadeem Iqbal
(74) *Attorney, Agent, or Firm* — Seed IP Law Group LLP (57) ABSTRACT

A risk management system includes a plurality of sensors coupled to a processor and to an electrical device, which may be a utility asset, to monitor operational characteristics of the electrical device. The processor may send sensor data and/or processed information to a memory for storage. The processed information, the sensor data, or both are visually and graphically presented in a radar chart, a table, and a sliding scale interface for both selecting data and interpreting data provided by the processor. The combination of the radar chart, the table, and the sliding scale interface allows a user of any level of training or education to quickly and efficiently interpret the sensor data, the processed information, or both with respect to the electrical device. The radar chart depicts a failure profile that provides a visual summary of determined risk scores corresponding to subcomponents of the electrical device that may need investigation, maintenance, or replacement.

20 Claims, 4 Drawing Sheets

METHOD AND DEVICE FOR ASSESSING OVERALL ASSET CONDITION

BACKGROUND

Technical Field

The present disclosure is directed to a risk management system and device to graphically present risk scores and factors to assess an asset's condition and risk of failure, and a method of processing and presenting sensor data, risk scores, and probabilities of failure to assess an asset's condition and risk of failure.

Description of the Related Art

Generally, risk management systems and devices are coupled to an asset, such as an electrical component or device, to collect data from sensors to determine a condition of the asset, for example a likelihood of failure in the asset. These risk management systems and devices may include sensors, processors, displays, and a number of other components that are coupled to the asset to monitor the condition of the asset. These risk management systems provide the needed information and analysis to provide condition-based maintenance (CBM) to various assets based on conditions of the assets.

There are significant challenges to provide risk management systems, devices, or software that allow engineers, maintenance staff, or individuals to quickly evaluate the condition of an asset, and, in particular, determine whether action must be taken with respect to a likelihood of failure in the asset and accurately direct their attention to a particular component that is likely to lead to the failure; graphical depictions of data that anyone can quickly comprehend and understand with little to no training are desired. Examples of visual depictions of data include bar graphs, line graphs, spreadsheets, and any number of other visual depictions of data.

One significant challenge is to provide a risk management system or device that reduces the amount of training to use the risk management system or device while maintaining an individual's ability to accurately determine when an asset should be repaired, when preventative action should be taken, and what component of the asset should be repaired or further investigated based on a determined likelihood of failure in the asset.

Another significant challenge is to provide a risk management system or device that allows a user to quickly determine whether to replace or fix particular subcomponents of the asset before failure. For example, if a determined likelihood of failure is great in only one specific component of the asset and likelihood of failure is low in all of the other subcomponents of the asset, then the user will be aware as to the necessity to only look at, maintain, or replace the specific component in which the likelihood of failure is high.

Another significant challenge is to display data in a manner that can be quickly reviewed and understood by persons reviewing the data, for example, using visual graphical depictions of the data.

Another significant challenge is that when several various smart sensors are utilized, each with their own individual monitoring interface, it becomes difficult for a user to review the sensor data individually for each smart sensor and make determinations as to the status of an asset without having to perform several complex analytic calculations or review the sensor data for patterns.

Yet another significant challenge is providing data and enough detail in a visual depiction of the data in a manner that allows nearly any user to quickly come up with a course of action, e.g., action plan, in handling and determining when a repair is necessary or replacement is necessary based on the condition of the asset. For example, this action plan may start with traditional laboratory confirmation of the status of an asset that is monitored and continue with additional steps depending on the outcome of the laboratory confirmation.

Still another significant challenge is providing a risk management system that requires simple, little, or no manual input on behalf of the user in order for the risk management system to visually display data and calculations in a manner that the user can quickly digest and understand within a short period of time, e.g., minutes of work instead of hours of work.

BRIEF SUMMARY

In view of the above significant challenges, which are not a complete list, it is desirable to provide a system with a user interface that allows any user of any level of training or education with the user interface to quickly and easily determine how, why, and when a utility asset, which may be an electrical device, is failing or needs preventative maintenance to avoid failure.

The present disclosure is directed to various embodiments of a risk management system and a visual and graphical depiction of data generated by the risk management system in a user interface, as well as a method of operation of the risk management system and the user interface.

According to one embodiment of the risk management system, a plurality of sensors is coupled to a utility asset and a processor. The plurality of sensors is arranged to monitor or sense operational aspects of an asset, such as an electrical component or device. The plurality of sensors sends sensor data generated by the sensors to the processor for processing. The processor receives the sensor data and processes and converts the sensor data into processed information as desired. The processor is coupled to a memory and the processor may send the sensor data, the processed information, or both to the memory for storage. The sensor data may be utilized at the same time or later by the processor to predict when failure of the asset may result or maintenance may be required. The processor is also coupled to a display.

The display presents a user interface that provides a visual and graphical depiction of the sensor data, the processed information, or both. In at least one embodiment, the user interface includes a radar chart, a table, and a timeline selection scale. The radar chart depicts risk scores calculated or determined by the processor. These risk scores may be grouped by subcomponents of an asset and further navigation into the specific defects and details related to the subcomponents is shown in the radar chart. The table depicts a number of defect types, a number of warning percentages representative of how important the defect type is when reviewing the asset's operation, and a number of bar graphs representative of probabilities of failure of the defect types.

In other alternative embodiments of the risk management system, the risk management system may include multiple pluralities of sensors and may have the various components of the risk management system coupled together in different manners than the embodiment discussed directly above.

In other alternative embodiments of the user interface, the user interface may include other types of graphical depictions of the data and may have the various components of the user interface organized in different manners than the embodiment discussed directly above.

BRIEF DESCRIPTION OF THE SEVERAL VIEWS OF THE DRAWINGS

Embodiments described herein may be better understood with reference to the accompanying drawings, in which.

DETAILED DESCRIPTION

The present disclosure is directed to a risk management system and device for assessing a likelihood of failure in a utility asset or other asset including, e.g., an electrical device such as a transformer, a generator, an electrical connection, an electrical engine, or other type of electrical device or power driven device, based on data generated by a plurality of sensors arranged with respect to the asset. The plurality of sensors may be configured to generate data such as temperature, cooling efficiency, voltage, current, and other various data with respect to the asset being monitored by the plurality of sensors.

Figure 1:
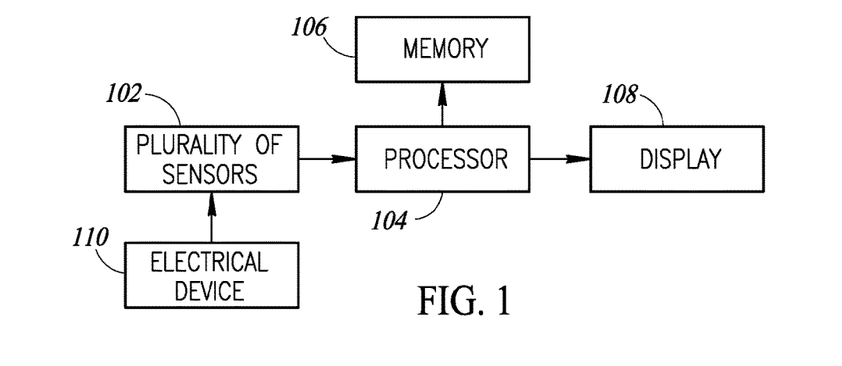
FIG. 1 is a block diagram of an embodiment of a risk management system.

FIG. 1 illustrates an embodiment of a risk management system 100. The risk management system includes a plurality of sensors 102, a processor 104, a memory 106, and a display 108. In one embodiment, the processor 104 and the display 108 may be components of a risk management device. In an alternative embodiment, the processor 104, the memory 106, and the display 108 may be components of a risk management device. In yet another alternative embodiment, plurality of sensors 102, the processor 104, the memory 106, the processor 104, and the display 108 may be components of a risk management device. The risk management system 100 is coupled to a utility asset or other asset such as an electrical device 110 so as to monitor operational characteristics of the electrical device 110. The electrical device 110 may be, for example, without limitation, a transformer, a generator, a battery, an electrical connection, an electrical wire, an electrical engine, other type of electrical device or power generating device, a load tap charger, or a combination of electrical devices or power generating devices. The plurality of sensors may include, without limitation, temperature sensors, voltage sensors, current sensors, moisture sensors, control monitoring sensors, orientation sensors, power sensors, on-line dissolved gas analysis sensors, or other sensors or combination of sensors that monitor any other operational characteristic of the electrical device 110 as desired.

The plurality of sensors 102 are communicatively coupled to a processor 104 and communicate sensor data to the processor 104. The processor receives the sensor data and processes the sensor data. The processor 104 utilizes the sensor data to calculate or otherwise determine a plurality of probabilities of failure of the electrical device 110, or subcomponents thereof, based on the sensor data. The plurality of the probabilities of failure may include, for example, probabilities of overheating failure, current overload failure, voltage overload failure, electrical arcing failure, loose electrical connection failure, moisture contamination failure, cooling control failure, or any other type of failure or defect.

The plurality of probabilities of failure may be at least two or more probabilities of failure. The plurality of sensors may be coupled to the electrical device 110, or the plurality of sensors 102 may be coupled to the subcomponents of the electrical device 110 and positioned relative to the subcomponents of the electrical device 110. Any combination of respective sensors of the plurality of sensors 102 may be coupled to respective subcomponents of the electrical device 110. For example, each respective sensor of the pluralities of sensors 102 may be coupled to a respective subcomponent of the electrical device 110, or multiple respective sensors of the pluralities of sensors 102 may be coupled to one respective subcomponent of the electrical device 110 or may be coupled to multiple respective subcomponents of the electrical device 110. The plurality of sensors 102 detects operational characteristics of the subcomponents of the electrical device 110. The sensor data may be diagnostic data that includes n-number of diagnostic data points.

The processor 104 utilizes the probabilities of failure to calculate a plurality of risk scores for a plurality of subcomponents of the electrical device 110. In at least one embodiment, each respective risk score of the plurality of risk scores corresponds to a respective subcomponent of the plurality of subcomponents. Each respective risk score is determined by a weighted calculation of various probabilities of failure, a weighted calculation of warning percentages, or a weighted calculation of a combination of the probabilities of failure and the warning percentages. Each risk score may have its own weighted calculation utilizing any number of the probabilities of failure and any number of the warning percentages. The weighting may also include weighting for each individual asset. More specifically, a specific defect type as it applies to a specific asset that is monitored may be weighted as well to determine the specific risk of failure from that specific defect type for the specific asset being monitored. The processor may also utilize the sensor data either alone or in combination with the probabilities of failure to calculate the plurality of risk scores. The plurality of subcomponents of the electrical device 110 may include, for example, electrical wiring, electrical connections, batteries, control components, cooling components, coiled wire components, magnetic conductor components, winding components, or any other subcomponent that makes up the electrical device 110.

In at least one embodiment, the risk scores may have a magnitude ranging from 0 to 100. This magnitude of the risk scores may represent a percentage, a weighted value, or any other desired quantity to indicate a condition of a respective subcomponent of an electrical device. For simplicity and brevity, the risk score will be discussed with respect to being a number ranging from 0 to 100. When a respective risk score is 0, the condition of the respective subcomponent of the electrical device 110 is in proper working condition, and when a respective risk score is 100, the condition of the respective subcomponent of the electrical device 110 likely needs to be replaced or repaired to bring the respective subcomponent into proper working condition.

The processor 104 calculates the probabilities of failure by utilizing the n-number of diagnostic data points of the sensor data. The n-number of diagnostic data points are grouped into an m-number of groups of the diagnostic data points. The m-number of groups may be greater than, equal to, or less than the n-number of diagnostic data points. Some of the n-number of the diagnostic data points may be included in several of the m-number of groups of the diagnostic data points or may be included in just one of the m-number of groups of the diagnostic data points. Each respective group of the m-number of groups of the diagnostic data points corresponds to a defect type. The m-number of groups of the diagnostic data points is equal to a number of defect types. The m-number of groups of the diagnostic data points are then utilized in a weighted calculation to determine each probability of failure corresponding to each defect type. The weighted calculation provides greater weight or importance to some of the diagnostic data points in each of the m-number of groups when calculating each probability of failure, and the weight given to the diagnostic data points in the m-number of groups may differ depending on the group of data being utilized in the calculation. In at least one embodiment, the number of defect types is equal to a number of the probabilities of failure that are calculated utilizing the m-number of groups of diagnostic data points. Each probability of failure corresponds to a defect type.

Once the probabilities of failure are calculated for each respective defect type, the probabilities of failure are utilized to calculate the risk scores for the subcomponents of an electrical device. The risk scores are calculated by a weighted calculation utilizing the probabilities of failure. This weighted calculation in regard to the risk scores may be similar to the weighted calculation used in calculating the probabilities of failure in that some probabilities of failure are given greater weight than other probabilities of failure when calculating the risk score for a corresponding subcomponent of an asset. The risk scores are representative of a condition of a respective subcomponent of an asset. Typically, the greater the risk score, the worse the condition of the subcomponent, and the lower the risk score, the better the condition of the subcomponent. However, in other alternative embodiments, the opposite may be true in that the lower the risk score, the worse the condition the subcomponent, and the greater the risk score, the better the condition of the subcomponent. The probabilities of failure may be passed through an analytic relationship model (ARM), for example a random forest decision tree, to calculate the risk scores.

After the sensor data with the diagnostic data points is utilized to calculate the probabilities of failure, and the probabilities of failure are utilized to calculate the risk scores, the risk scores are presented on the display 108. The manner in which the sensor data, the probabilities of failure, and the risk scores are presented on the display 108 will be discussed in detail with respect to the window 300 shown in FIG. 5. This information presented on the display 108 allows a user of the risk management system 100 to determine an action plan on how to maintain, repair, or replace the subcomponents of the electrical device 110 or whether it is necessary to replace the entire electrical device altogether. In addition, this information allows the user to easily create the action plan in determining who will make the repair, when the repair needs to be made, how the repair needs to be made, and what repair needs to be made. The user may be an engineer; however, because the information is presented in a manner that is easily digestible by anyone, and anyone with minimal to no training can understand and interpret the condition of the subcomponents of the electrical device 110 because the data is graphically depicted in a table with columns 302, 304, 306 and a radar chart 310, which will be discussed in further detail below with respect to FIG. 5.

The sensor data generated by the plurality of sensors 102 and received by the processor 104 may be sent or communicated to the memory 106, which is coupled to the processor 104. Processed information, which may include the probabilities of failure and the risk scores determined or calculated by the processor 104 may also be sent or communicated to the memory 106. The memory 106 stores the sensor data, the processed information, or any other data or combination of data that is sent to the memory 106 for storage. The processor 104 and the memory 106 may be operative in a multimeter, a computer, a tablet, a smartphone, or other type of electrical device that is communicatively coupled to the plurality of sensors. The processor 104 and the memory 106 may be coupled to the plurality of sensors through physical electrical connections, such as wires, or by wireless connections through Wi-Fi, long distance RF or microwave signals, or other wireless connection or combination of wireless connections. The memory 106 may be a memory device such as ROM, PROM, RAM, SRAM, DRAM, SIMM, or DIMM. The memory 106 may be a memory that is in a separate device from a processor, or the memory may be in a device that contains both the memory and the processor.

The processor 104 is communicatively coupled to the display 108. The display 108 may be, without limitation, a display screen, a tablet screen, a phone screen, a computer screen, a monitor, or other type of display medium or display device. The display 108 may be referred to as a display screen, a display medium, or a display. The processor 104 sends the processed information, such as the risk scores and the probabilities of failure, to the display 108 and the display 108 presents the risk scores and the probabilities of failure. In at least one embodiment, the risk scores are presented in a user interface, such as a window, on the display 108 in the form of a radar chart and the probabilities of failure are presented on the display 108 in the form of a plurality of bar graphs, which can be seen for example in FIG. 5. The user interface presented on the display 108 will be discussed in greater detail below with respect to FIG. 5.

Alternatively, the display 108 may be a type of display medium other than an electronic display screen. For example, the display 108 may be a paper printout, a projection, a poster, or other type of display medium.

Figure 2:
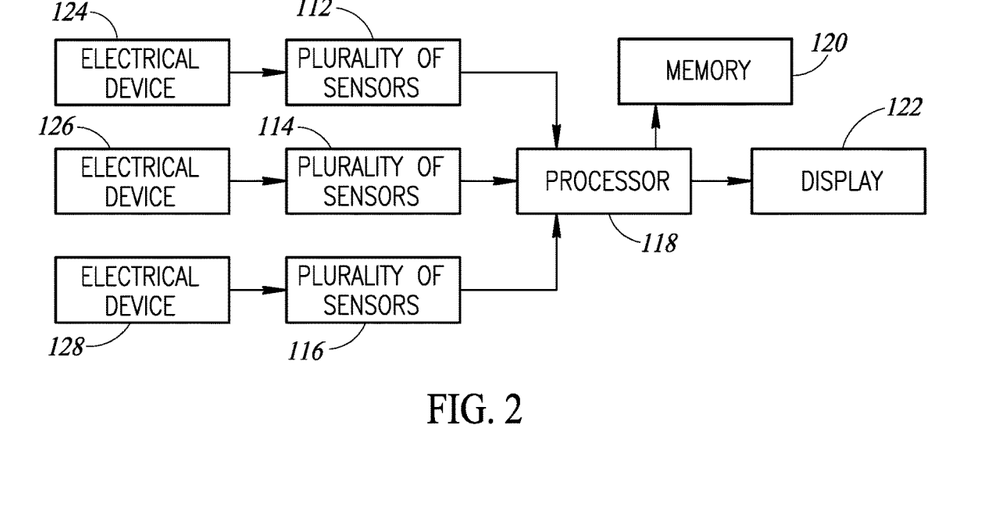
FIG. 2 is a block diagram of an alternative embodiment of a risk management system.

FIG. 2 is directed to an alternative embodiment of a risk management system that includes multiple pluralities of sensors 112, 114, 116, a processor 118, a memory 120, and a display 122. The pluralities of sensors include a first plurality of sensors 112, a second plurality of sensors 114, and a third plurality of sensors 116 that are communicatively coupled to the processor 118. The first plurality of sensors 112 is coupled to a first asset (electrical device) 124, the second plurality of sensors 114 is coupled to a second asset (electrical device) 126, and the third plurality of sensors 116 is coupled to a third asset (electrical device) 128. The first plurality of sensors 112 monitors the first electrical device 124, the second plurality of sensors 114 monitors the second electrical device 126, and the third plurality of sensors 116 monitors the third electrical device 128. The assets 124, 126, 128 may be, for example, gas insulated switch gear (GIS), gas-insulated transmission lines (GIL), breakers, bushings, transformers, generators, batteries, electrical connections, electrical wires and cables, electrical engines, other type(s) of electrical devices or power generating devices, or a combination of electrical devices or power generating devices. The electrical wires and cables may be medium voltage (MV), high voltage (HV), extra high voltage (EHV), or ultra-high voltage (UHV) cables or wires. The first, second, and third pluralities of sensors 112, 114, 116 may include, for example, temperature sensors, voltage sensors, current sensors, moisture sensors, control monitoring sensors, orientation sensors, power sensors, other sensors or combination of sensors that monitor any other operational characteristic of the assets 124, 126, 128 as desired. The assets 124, 126, 128 may be referred to as utility assets, but are not necessarily limited to assets deployed by electrical utilities.

In the illustrated embodiment, the processor 118 is coupled to the first plurality of sensors 112, the second plurality of sensors 114, and the third plurality of sensors 116 and receives sensor data and processes the sensor data in the same manner as discussed earlier with respect to the processor 104 in FIG. 1. The processor 118 calculates and outputs probabilities of failures and risk scores, each risk score corresponding to a respective subcomponent of a respective asset 124, 126, 128. As mentioned earlier, the risk scores may have a magnitude ranging from 0 to 100, and may represent a percentage, a weighted value, or other desired quantity to indicate a condition of a respective subcomponent of the asset. When a respective risk score is 0, the condition of the respective subcomponent of the asset 124, 126, 128 is in a proper working condition, and when a respective risk score is 100, the condition of the respective subcomponent of the asset 124, 126, 128 likely needs to be replaced or repaired to bring the respective subcomponent into proper working condition. In other words, there is a maximum parameter and a minimum parameter, which may be a scale from 0 to 100 as discussed above or another scale system such as a value from 1 to 5, a grade letter, or some other min-max scaling parameter. When a respective risk score is a maximum parameter, the condition of the subcomponent of the asset 124, 126, 128 likely needs to be replaced or repaired to bring the respective subcomponent into proper working condition, and when a respective risk score is the minimum parameter, the condition of the respective subcomponent of the asset 124, 126, 128 is in proper working condition.

In an alternative embodiment, the reverse may be true, for example, when a respective risk score is 0, the condition of the respective subcomponent of the asset 124, 125, 126 likely needs to be replaced or repaired to bring the respective subcomponent into proper working condition, and when a respective risk score is 100, the condition of the respective subcomponent of the asset 124, 126, 128 is in a proper working condition. In other words, there is a maximum parameter and a minimum parameter. In this alternative embodiment, when a respective risk score is the minimum parameter, the condition of the respective subcomponent of the asset 124, 125, 126 likely needs to be replaced or repaired to bring the respective subcomponent into proper working condition, and when a respective risk score is the maximum parameter, the condition of the respective subcomponent of the asset 124, 126, 128 is in a proper working condition The memory 120 is communicatively coupled to the processor and may store the sensor data and/or the processed information in the same manner as discussed earlier with respect to the memory 106 in FIG. 1. The processor 118 and the memory 120 may be, for example, components of a multimeter, a computer, a tablet, a smartphone, or other electrical device that includes a processor and a memory. In other alternative embodiments of the risk management system, multiple processors and memories may be utilized.

The display 122 may be a display screen, a tablet screen, a phone screen, a computer screen, a monitor, or other type of display device. In the illustrated embodiment, the display 122 presents the probabilities of failure and the plurality of risk scores in the same manner as discussed earlier with respect to the display 108 in FIG. 1.

The first electrical device 124, the second electrical device 126, and the third electrical device 128 each have a respective plurality of subcomponents that may include, for example, electrical wiring, electrical connections, batteries, control components, cooling components, coiled wire components, magnetic conductor components, winding components, or any other subcomponent that makes up the assets 124, 126. 128.

Figure 3:
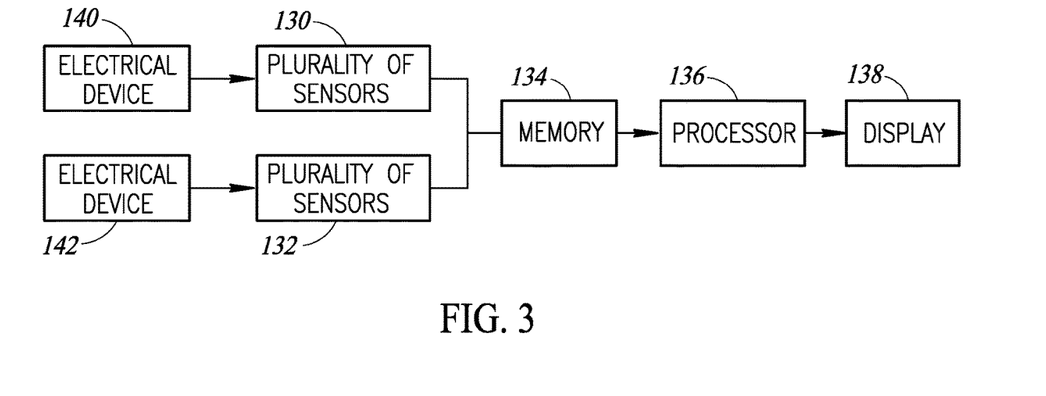
FIG. 3 is a block diagram of another alternative embodiment of a risk management system.

FIG. 3 is another alternative embodiment of a risk management system that includes pluralities of sensors 130, 132, a memory 134, a processor 136, and a display 138. The pluralities of sensors include a first plurality of sensors 130 and a second plurality of sensors 132. The first plurality of sensors 132 is coupled to and monitors a first electrical device 140, and the second plurality of sensors 132 is coupled to and monitors a second electrical device 142. As with the earlier-discussed embodiments, the electrical devices 140, 142 may be, for example, transformers, generators, batteries, electrical connections, electrical wires, electrical engines, other type of electrical devices or power generating devices, or a combination of electrical devices or power generating devices. The first and second pluralities of sensors 130, 132 may include, for example, temperature sensors, voltage sensors, current sensors, moisture sensors, control monitoring sensors, orientation sensors, power sensors, other sensors or combination of sensors that monitor any other operational characteristic of the electrical devices 124, 126, 128 as desired.

In the embodiment shown in FIG. 3, the memory 134 is communicatively coupled to the first plurality of sensors 130 and the second plurality of sensors 132. The first plurality of sensors 130 and the second plurality of sensors 132 send sensor data to the memory. The memory 134 receives the sensor data and the memory 134 communicates the sensor data to the processor 136. The memory 134 and the processor 136 may be in a multimeter, a computer, a tablet, a smartphone, or other type of electrical device that is coupled to the pluralities of sensors 130, 132.

In the illustrated embodiment, the processor 136 receives the sensor data from the memory 134 and processes the sensor data in the same manner as discussed earlier with respect to the processor 104 in FIG. 1. The processor 136 calculates and outputs probabilities of failures and risk scores, each risk score corresponding to a respective subcomponent of a respective electrical device 140, 142.

The display 138 may be a display screen, a tablet screen, a phone screen, a computer screen, a monitor, or other type of display device. In the illustrated embodiment, the display 138 presents the probabilities of failure and the plurality of risk scores in the same manner as discussed earlier with respect to the display 108 in FIG. 1.

While only one processor and one memory are illustrated in FIGS. 1-3, in other alternative embodiments of a risk management system, the risk management system may include a plurality of memories and a plurality of processors. For example, each respective processor of the plurality of processors and each respective memory of the plurality of memories may correspond to each respective electrical device being monitored, and each respective plurality of sensors is coupled to each respective electrical device.

Figure 4:
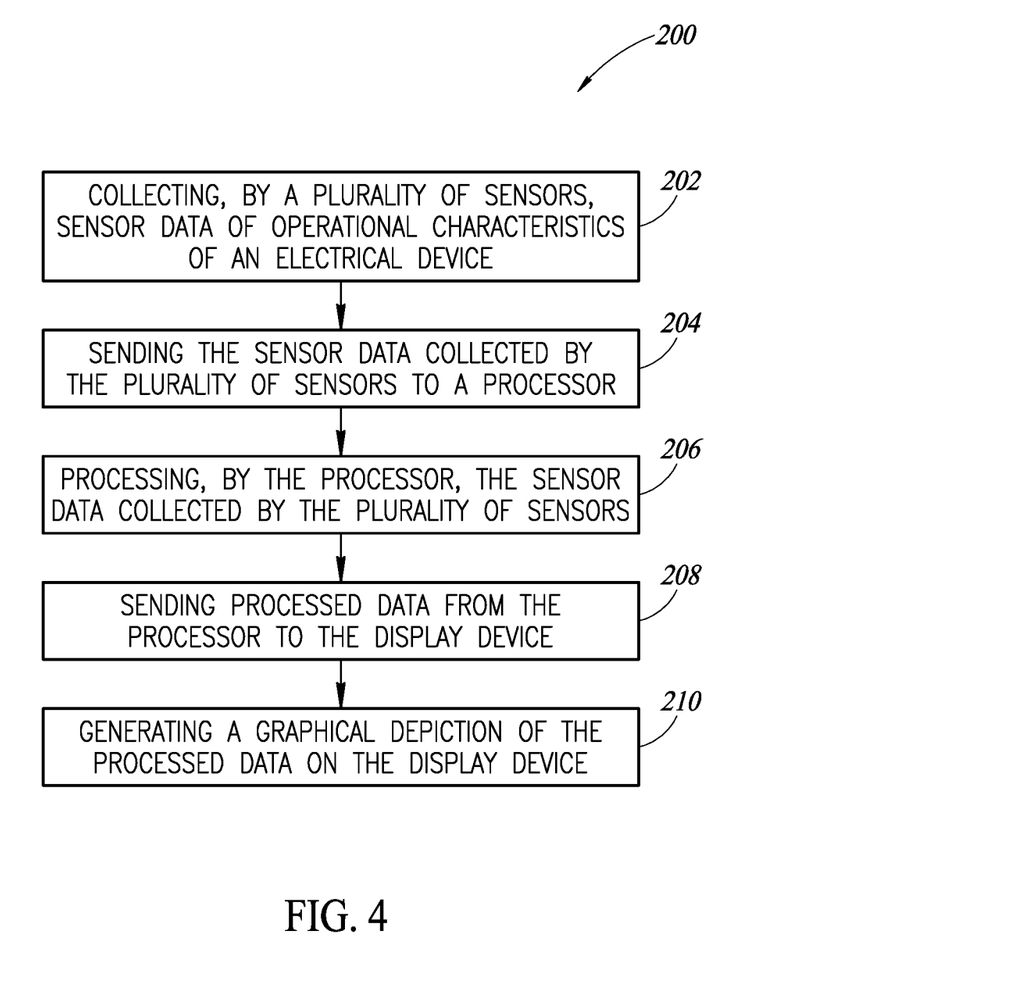
FIG. 4 is a flow chart of a method of processing and displaying an output by an embodiment of a risk management system.

FIG. 4 is directed to a flow chart of a method 200 of processing and presenting an output by an embodiment of a risk management system. Although the following discussion is provided with respect to one electrical device, one processor, one plurality of sensors, and one display device, any number of these components may be utilized in alternative embodiments of the risk management system.

In a first step 202, a plurality of sensors are configured to detect operational characteristics of an electrical device and generate data, which will be referred to as sensor data, with respect to the operational characteristics of the electrical device, such as temperature, voltage, current, moisture, control monitoring, orientation, power, or other operational characteristic(s) of the electrical device being monitored.

In a second step 204, the plurality of sensors sends the sensor data to a processor. The plurality of sensors may send the sensor data to the processor through a physical connection such as electrical wires or other physical connection or a combination of connections for communicating data from a sensor to another device. Alternatively, or in addition, the plurality of sensors may send the sensor data to the processor through a wireless connection such as Wi-Fi, a long distance signal, or a short distance signal, in a network or other type of wireless connection or combination of wireless connections. The plurality of sensors may send the sensor data to the processor through a combination of physical connections and wireless connections as discussed above.

In a third step 206, the processor receives the sensor data generated and sent by the plurality of sensors and processes the sensor data into processed information. The processed information includes a plurality of probabilities of failures and a plurality of risk scores, wherein each respective risk score corresponds to a respective subcomponent of the electrical device being monitored. The subcomponents of the electrical device may include, for example, electrical wiring, electrical connections, batteries, control components, cooling components, coiled wire components, magnetic conductor components, winding components, or any other subcomponent that makes up the electrical device. The probabilities of failure are calculated by utilizing the sensor data generated by the plurality of sensors, and each respective risk score of the plurality of risk scores is determined from a weighted calculation utilizing the plurality of probabilities of failure.

In at least some embodiments, the processor may utilize machine learning or artificial intelligence (AI) to conduct the weighted calculation to determine the respective risk scores of the plurality of risk scores. For example, as the processor collects sensor data from the plurality of sensors and the processor processes the sensor data, the artificial intelligence of the processor monitors the sensor data to determine patterns in the data that correspond to when respective risk scores in various subcomponents are determined to represent higher or lower risks of failure.

The artificial intelligence then utilizes these patterns over time to adapt the weights and/or functions of the weighted calculation when determining further respective risk scores. For example, if a respective probability of failure is always high and results in a corresponding subcomponent to have a high risk score, which corresponds to a high likelihood of failure or actual failure of the subcomponent, then the artificial component may adjust the weighted calculation of the probabilities of failure when calculating the risk score of the respective subcomponent to reflect the fact that the subcomponent has a high risk score whenever that probability of failure is high. Additionally, when a probability of failure is low and a risk score for a corresponding risk score for a corresponding subcomponent is always low, then the artificial intelligence may adjust the weighted calculation accordingly to more quickly and accurately determine whether the risk score should be low, high, or somewhere in between low and high.

In a fourth step 208, the processor sends the processed information, which includes the probabilities of failure and the risk scores, to the display device to be presented to a user of the risk management system. The display device may be a display screen, a tablet screen, a phone screen, a computer screen, a monitor, or some other type of display device.

In a fifth step 210, graphical depictions are generated to display the processed information on the display device. The graphical depictions may include a radar chart, a bar graph, a table of data, timeline chart, or other graphical depiction or combination of graphical depictions. The processor may generate the graphical depiction presented on the display device. In at least one embodiment, the processed information is displayed in a manner as depicted in FIG. 5, which will be discussed in detail below.

In the above method 200 and alternative embodiments of the above method 200, the sensor data and the processed information may be sent to a memory, such as the memory 106, 120, 134, and the memory stores the sensor data, the processed information, or both. The sensor data, the processed information, or both may be encoded, encrypted, compressed, raw, or in any other form as desired.

In alternative embodiments in the method, the steps above may be organized in a different manner than shown in FIG. 4. For example, in the alternative embodiment of the risk management system in FIG. 3, the memory 134 is communicatively coupled to the pluralities of sensors 130, 132 and stores the sensor data received directly from the pluralities of sensors 130, 132. The memory 134 stores the sensor data and then sends or communicates the sensor data to the processor 136, which processes the sensor data and converts the sensor data into processed information. The processor 136 then sends or communicates the processed information to the display 138. In addition to the processed information that the processor 136 sends to the display 138, the processor 136 may also send or communicate the underlying sensor data to the display 138 as well.

Figure 5:
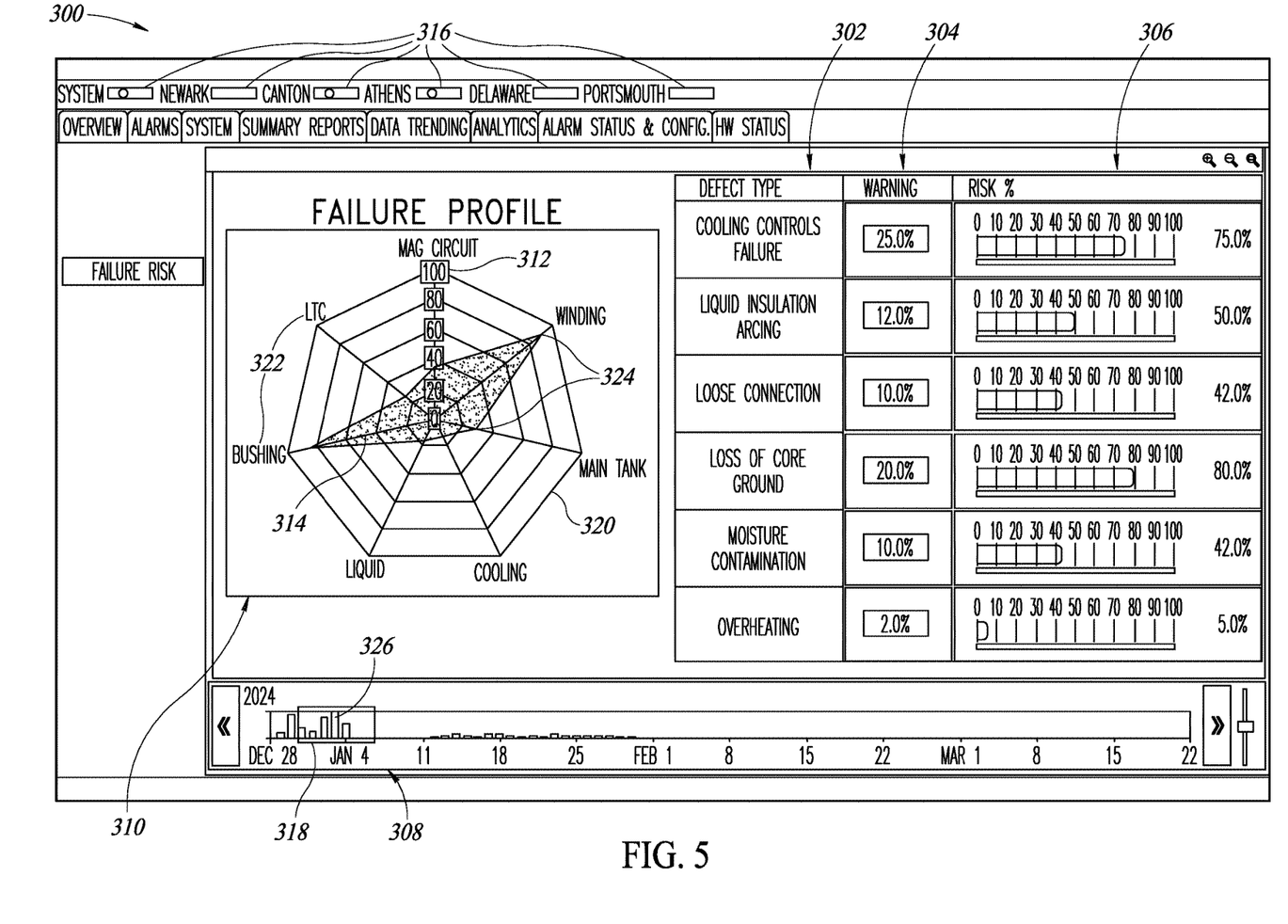
FIG. 5 is a view of a user interface presented on a display screen output by an embodiment of a risk management system.

FIG. 5 illustrates a user interface, such as a window 300, presented on a display screen, as output by an embodiment of the risk management system. The window 300 includes a table including a plurality of columns 302, 304, 306 that contain data that is either from a processor or a plurality of sensors monitoring an electrical device, as well as a risk radar chart 310. The table may contain bar graphs, percentages, labels, or any other data generated or processed to be presented on the display screen as desired. In this embodiment, the plurality of columns of the table includes a first column 302, a second column 304, and a third column 306.

The first column 302 includes various types of defects referred to herein as "defect types" that may occur, for example, in an electrical device, a power generating device, or other device that a plurality of sensors is arranged to monitor. Generally speaking, the defect types may include, for example, control failure, overheating, loose connections, moisture contamination, water damage, electrical arcing failure, current leakage, voltage leakage, dielectric insulation decomposition, or other type of failure or defect that may result in failure of the electrical device, power generating device, or other device being monitored. In this particular embodiment, the defect types include cooling controls failure, liquid insulation arching, loose connections, loss of core ground, moisture contamination, and overheating. In other embodiments, there may be any number of defect types, and further, all of the defect types may not be visible in the window all at the same time. The table 302, 304, 306 may include a scroll bar for scrolling to view additional defect types determined from the data generated by a plurality of sensors.

The second column 304 is adjacent to the first column 302 and contains percentages referred to herein as "warning percentages" that are indicative of the amount of weight of importance that is given to that defect type. For example, if a defect type is one that is found to occur more frequently in an electrical device than other defect types, the defect type that occurs with greater frequency may be given a greater weighted percentage or a greater warning percentage. When a respective defect type has a greater warning percentage than other respective defect types, the defect type with the greater warning percentage is considered to be more important to pay attention to than the other respective defect types. Warning percentages for respective defect types may be determined based on a number of factors such as frequency of the defect type, damage resulting from the defect type, or any other factor as desired in determining whether one defect type is more important to monitor than another defect type.

The third column 306 is adjacent to the second column 304 and contains bar graphs that are representative of probabilities of failure due to the defect type in the electrical device, power generating device, or other device being monitored. The probabilities of failure are calculated utilizing data generated by a plurality of sensors coupled to the device being monitored, as well as the warning percentage assigned to that defect type. Each respective bar graph representative of a respective probability of failure is aligned with a corresponding defect type and warning percentage in each row. Each bar graph has a scale from 0% to 100%, and a color scale of green, yellow, and red may be positioned directly below the scale to indicate when the probability of failure of the defect type is acceptable and when the probability of failure for the corresponding defect type is unacceptable. The probability of failure provides the likelihood of presence of the defect in the device being monitored. For example, as the probability of failure increases, the likelihood that the corresponding defect type is present in the device being monitored increases, and as the probability of failure decreases, the likelihood that the corresponding defect type is present in the device being monitored decreases.

The table 302, 304, 306 includes two or more probabilities of failure depicted by two or more bar graphs and two or more warning percentages. In alternative embodiments, the probabilities of failure and warning percentages may be represented by a number between any range of values, a letter grade, or any other indication for providing a user with an indication of a probability of failure or warning percentage due to the corresponding defect type in the first column 302 of the table. The two or more bar graphs are visible within the display screen at the same time that the radar chart 310 is graphically depicted with the risk scores of the subcomponents of the electrical device being monitored. Although not shown in this embodiment, the two or more probabilities of failure, which may be expressed as percentages, may be presented in columns of the table 302, 304, 306 at the same time as the radar chart 310, and may be depicted on the display screen at the same time that the radar chart 310 is visible on the display screen.

As illustrated, the risk radar chart 310 is adjacent to the table and provides a failure profile 314. The failure profile 314 has an n-sided shape with vertices that correspond to a plurality of risk scores corresponding to a plurality of subcomponents 322 of the device being monitored. In the chart as illustrated, the closer that a point 324 of the failure profile 314 is to an outer edge 320 of the radar chart 310 and the farther the point 324 is from the center of the radar chart 310, the greater the chance that a corresponding subcomponent is close to failure or necessitates replacement. The farther that the point 324 of the failure profile is from the outer edge 320 of the radar chart 310 and the closer that the point 324 is to the center of the radar chart 310, the less chance there is that the corresponding subcomponent is close to failure or necessitates replacement. For example, points 324 of the failure profile 314 that are close to the outer edge 320 of the radar chart 310 corresponds to a bushing subcomponent and a winding subcomponent, which means the bushing and winding subcomponents may be failing and may need to be replaced. In addition, the points 324 corresponding to other subcomponents, e.g., load tap changer (LTC), mag circuit, main tank, cooling, and liquid subcomponents, are closer to the center of the radar chart 310 than to the outer edges 320 of the radar chart 310, and the likelihood of failure or necessity to replace these subcomponents is less than the winding and bushing subcomponents.

The n-sided shape of the failure profile 314 depends on the number of subcomponents that are being monitored in the electrical device. For example, if three subcomponents of the electrical device are being monitored, then the failure profile 314 will be in the shape of a triangle. If four subcomponents of the electrical device are being monitored, then the failure profile will be a four-sided shape, e.g., in the shape of a square or rectangle, and so on. In order to present the data in a radar chart as shown, at least three subcomponents in the electrical device must be monitored.

Thus, the n-sided shape of the failure profile 314 has at least three sides and at least three points 324. The points 324 are intersecting points of the at least three sides of the n-sided shape. The risk radar chart 310 illustrates at least three magnitudes of risk scores for the at least three subcomponents. Each respective magnitude of the risk scores corresponds to a respective subcomponent of the at least three subcomponents. Each of the respective risk scores corresponds to a respective point 324 of the at least three points 324, and the respective points 324 are representative of the respective risk scores. Each of the respective points 324 is presented on the radar chart 310 at different coordinates to represent the respective risk scores of each respective subcomponent. Each of the respective points 324 has a distance from a center point of the graph that is representative or based on the magnitude of the respective risk score. As the distance of the point 324 from the center point increases for a respective risk score, a user observing the failure profile 314 can quickly and efficiently identify the subcomponents of the electrical device that warrant further investigation, maintenance, or replacement.

In the illustrated embodiment, the radar chart 310 includes labels for the at least three subcomponents 322 on the outer edge 320. Each respective label for each of the at least three subcomponents 322 is circumferentially placed at a position along the outer edge 320 of the radar chart.

The radar chart 310 includes scale indicators 312 that indicate the magnitude of the risk scores for the various subcomponents in a visual capacity. In the illustrated embodiment, the scale indicators 312 indicate a range of risk scores from 0 to 100. The scale indicator of 0 indicates no failure in the subcomponent, or no likelihood of failure in the subcomponent, and no need to replace the subcomponent. The scale indicator of 100 indicates there is a failure or a high likelihood of failure in the subcomponent, and that the subcomponent needs to be replaced. While the scale indicators 312 range from 0 to 100 in this embodiment, the scale indicators 312 may range between any set of values as desired to indicate one subcomponent having a higher risk score than another subcomponent.

Data selection buttons and indicators 316 allow for a user to select data that the user would like to view in the radar chart 310 and in the columns of the table 302, 304, 306. The data selection buttons also act as indicators because the data selection buttons may be color coded green, yellow, or red depending on whether the device being monitored has a failure profile 314 with points 324 that are close to the outer edge 320 of the radar chart 310. When the selection button 316 is green, the selection button indicates that the user does not need to review the radar chart 310 and the table 302, 304, 306 for a respective electrical device. When the selection button 316 is yellow, the selection button indicates that the user may want to review the radar chart 310 and the table 302, 304, 306 for the respective electrical device. When the selection button 316 is red, the selection button indicates that the user should review the radar chart 310 and the table 302, 304, 306 for the respective electrical device to determine if a subcomponent within the respective electrical device is failing and needs to be replaced. These selection buttons and indicators 316 may be labeled with a location where the respective electrical device is located. Alternatively or in addition, the selection buttons and indicators 316 may be labeled with the type of electrical device that is being monitored, and/or may be labeled in any other desired manner.

The window 300 further includes a sliding scale interface 308. In this embodiment, the window 300 is representative of sensor data generated along a timeline. The sliding scale interface 308 includes a sliding selection interface 318 that allows a user to select data generated with respect to an electrical device over a specific time period. The sliding selection interface 318 can be adjusted to select a length of time to reduce or increase the amount of data that is selected as the sliding selection interface 318 is moved back and forth along the sliding scale interface 308. For example, as the length of time is reduced, the width of the rectangle becomes smaller, and as the length of time is increased, the width of the rectangle becomes larger. If the user wants to select only a specific time (e.g., a particular hour or day) for which data was collected, the sliding selection interface 318 may appear as a line. While a sliding scale interface 308 is considered advantageous in this embodiment for ease of use by the user, other data selection techniques may be utilized such as date ranges input directly by the user, pull down menus, calendar interfaces, or any other interface for selecting data for along a specific range of the data. While the timeline may be representative of actual data that is collected from the plurality of sensors, the timeline may also be representative of interpolated or predictive data that is calculated from patterns in the collected sensor data. The sliding selection interface 318 is visible within the display screen at the same time the radar chart 310 is depicted on the display screen.

In addition, the sliding scale interface 308 includes various bar graphs that represent data collected on specific days, over specific time periods, or any other length of time as desired. The bar graphs are representative of the likelihood of failure in an electrical device for that day or period of time. These bar graphs on the sliding scale interface 308 provide an easy visual depiction of points of time that the user would most likely be interested viewing when determining if the electrical device requires maintenance, replacement of the electrical device in its entirety, replacement of subcomponents of the electrical device, determination of when failure has occurred in the electrical device, or any other determination in points of interest along the sliding scale interface 308 based on the sensor data, the processed information, or both. For example, the bar graphs of the sliding scale interface 308 illustrate the summed risk, which may be representative of information generated on a specific day, during a specific time, or during a selected range of time, along the timeline for the asset that is being monitored. Accordingly, the taller the bar graph the greater the summed risk and the smaller the bar graph the lesser the summed risk. The summed risk of each bar graph enables the user to quickly see when the asset is more likely to fail or is failing.

While the bar graphs of the sliding scale interface 308 are shown as having no color in FIG. 5, as the bar graphs get taller the color may move along a spectrum from green to red. For example, a bar graph that is tall with a large summed risk will be red, a bar graph that is small with a small summed risk will be green, and a bar graph that is in between a large summed risk and a small summed risk will be yellow. In other words, as the summed risk increases the color of the bar graph will go from green for low summed risks, to yellow for intermediate summed risks, and to red for high summed risks. Accordingly, the combination of the change in height and the change in color of the bar graphs of the sliding scale interface 308 allows a user to quickly and easily determine when a probability of a risk of failure is low, intermediate, or high. This ease of use allows the user's attention to quickly be focused in on times when the risk of failure is high, and allows a user to easily compare and analyze why the asset had a high summed risk of failure at one time when compared to another time along the sliding scale interface 308.

Figure 6:
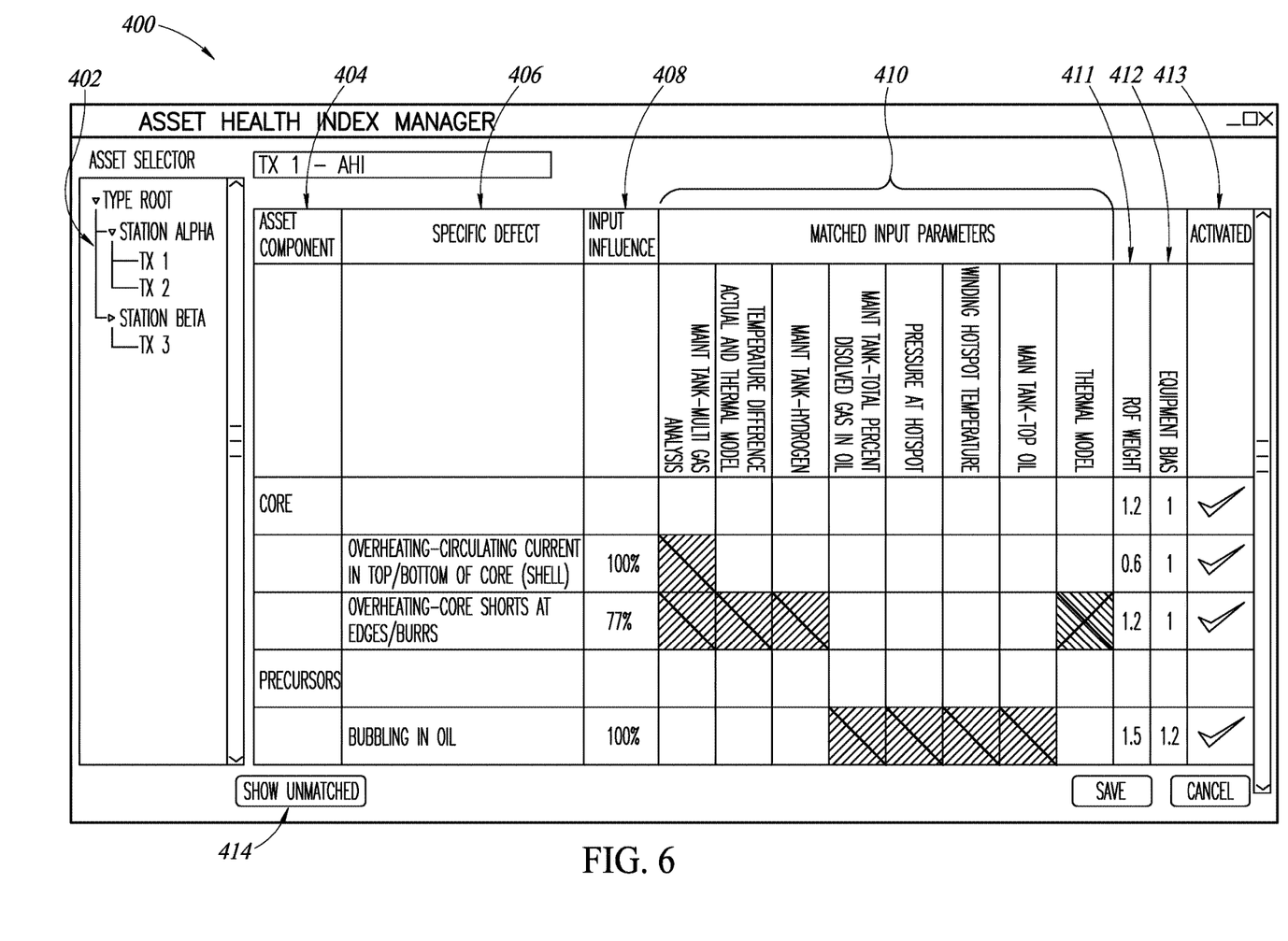
FIG. 6 is a view of a user interface for an auto configuration screen for selecting information presented on a display screen and output by an embodiment of a risk management system.

FIG. 6 illustrates a user interface, such as a window 400, presented on a display screen as an auto-configuration screen, which may also be referred to as a maintenance screen, a management screen, an auto-selection screen, or a parameter selection screen, for selecting from the applicable failure modes. These applicable failure modes will be utilized to determine an output, such as a risk score, by an embodiment of the risk management system. In this particular embodiment, the window 400 is labeled as an "Asset Health Index Manager." The window 400 (auto-configuration screen) includes an asset selector 402 that is configured to allow a user to select an asset within an asset tree. Once the user of the asset selector 402 has selected an asset from the asset tree, the analytics and subcomponents of the asset are presented in a table that is positioned adjacent to or near the asset selector 402.

A first column 404 of the table, which in the depicted embodiment is labeled as "asset component," contains the assets subcomponents of the asset being monitored. A second column 406 of the table, which is labeled here as "specific defect," contains defects that are related to each subcomponent of the asset. For example, a core, which is a subcomponent of the asset selected, has a first defect type of "overheating—circulating current in top, bottom of core (shell)," and a second defect type of "overheating—core shorts at edges/burrs," whereas a precursor, which may be a subcomponent of the asset or a parameter to be monitored in the asset when in use, has a first defect type of "bubbling in oil." As a user scrolls down the table there may be more subcomponents, defect types, or parameters for those respective subcomponents or parameters of the user-selected asset.

A third column 408 of the table, which is labeled here as "input influence," contains confidence percentages corresponding to each defect type in the second column 406. Each confidence percentage in the third column 408 is representative of whether a correct diagnostic calculation or determination can be provided for that defect based on the "matched input parameters," e.g., in a plurality of fifth columns 410. For example, as the confidence percentage increases, the probability increases that the diagnostic calculation or determination output by the risk management system for that specific defect is accurate and correct. Conversely, as the confidence percentage decreases, there is a decreasing probability that the diagnostic calculation or determination output by the risk management system for that specific defect is accurate and correct. A threshold confidence percentage can be set such that, if not met, the diagnostic for the defect type is not output by the risk management system because the likelihood of the diagnostic not being accurate is too high. For example, a threshold confidence percentage can be set at 65%, and when a confidence percentage is below or equal to 65%, the defect type is not provided a diagnostic calculation and is not utilized in determining a risk score of the subcomponent. The threshold confidence percentage can be set at 25%, 40%, 80%, or any desired amount by a user. The confidence percentages are calculated based on the number of "matched input parameters" that are monitored and utilized in calculating a probability of a risk of failure due to a specific defect in the subcomponent.

The suitability of a specific "asset component" to be used in an analytic process, calculation, or determination is determined by the inputs that are available for that "asset component." A confidence score is based on the inputs required to monitor the functionality of an "asset component." For example, in at least one embodiment, if only one input is required to monitor the functionality of the "asset component," and that input can be monitored by sensors within the asset as a whole, then the confidence percentage for that "asset component" may be 100%. Similarly, if two inputs are required to monitor the functionality of the "asset component," but only one input can be monitored by the sensors in the asset as a whole, then the confidence percentage for the "asset component" may be 50%. This relationship continues on for any number of inputs required or desired to monitor the functionality of any specific "asset component." If a confidence percentage for the "asset component" is greater than a user defined threshold, the "asset component" will appear in the "asset component" list 404. Conversely, if the confidence score for the "asset component" is less than the user defined threshold, the "asset component" will not appear on the "asset component" list 404. The user may select whether the asset component is or is not utilized in an analytic process, calculation, or determination when the confidence percentage is equal to the user defined threshold. Likewise, if preferred, the user may or may not select any combination of "asset components" as desired to be used in an analytic process, calculation, or determination, regardless of the confidence percentages. The analytic process, calculation, or determination may be used to evaluate the condition of the asset as a whole, to evaluate a specific "asset component" of the asset as a whole, or any other evaluation, determination, or calculation as desired.

The plurality of fourth columns 410, which is labeled here as "matched input parameters," contain information as to the parameters that are monitored based on sensors provided in the selected asset to monitor certain parameters of the selected asset. For example, some of the "matched input parameters," are "monitor tank—multi gas analysis," "temperature difference actual and thermal model," and several others as can be seen in FIG. 6. Any parameters as desired can be monitored based on any sensors that are incorporated into the selected asset.

The "matched input parameters" that are utilized to provide a diagnostic probability of the risk of failure due to a specific defect in the selected asset may be filled in with a color in a grid formed by the plurality of fourth columns 410 and rows of the table. For example, for the "core" subcomponent of the asset, only one parameter is utilized to calculate the risk of failure due to the specific defect of "overheating-circulating current in top/bottom of core (shell)." Alternatively (or in addition), for this subcomponent of the asset, four parameters are utilized to calculate the risk of failure due to the specific defect of "overheating—core shorts at edges/burrs." Three of the parameters are filled in with a slash and one of the parameters is filled in with an "X." The parameters that are filled in with a slash in the grid of the plurality of fourth columns and plurality of rows of the table are representative of the parameters that can be determined based on respective sensors that are incorporated into the selected asset, or are parameters that have been selected by a user to calculate a probability of risk of failure due to the specific defect. However, the parameter of "thermal model" that is filled in with an "X" is representative of a parameter that would normally be utilized to calculate or determine a diagnostic of the specific defect of "overheating-circulating current in top/bottom core (shell)," but it is not because either sensors incorporated in the selected asset cannot provide the necessary information to determine the "thermal model" parameter's effect on the specific defect, or a user has decided to turn this parameter off when calculating this specific defect. For the specific defect of "bubbling in oil" of the precursors subcomponent of the selected asset, four parameters are utilized to calculate the risk of failure for this specific defect. Each of the four parameters are filled in with slashes and the confidence percentage is 100%, which means that all of the parameters normally utilized to calculate this specific defect are being used to calculate the probability of risk of failure for this specific defect. In an alternative embodiment, the slashes may be representative of a green color fill to indicate the parameters that are being utilized and an "X" may be representative of a red color fill to indicate the parameters that are not being utilized.

In other words, the parameters selected or not selected in calculating a respective specific defect or defect type that may be present in a respective subcomponent of the asset, means that the parameters selected are utilized by an algorithm to calculate a probability of risk of failure or a risk score in the subcomponent, and, conversely, parameters not selected are not utilized by the algorithm to calculate a probability of risk of failure for a specific defect or a risk score of the subcomponent.

A fifth column 411 of the portion of the table labeled as "matched input parameters" is labeled as "ROF weight," which is representative of risk of failure (ROF) weight. This fifth column 411 contains the amount of weight set by a user that is given to the specific defect when the specific defect is utilized in calculating a risk score or a probability of risk of failure of subcomponent of the selected asset. For example, the risk of failure weight may be the amount of weight given to that specific defect risk of failure in an algorithm calculating a risk score for the subcomponent of the asset.

A sixth column 412 of the portion of the table labeled as "matched input parameters" is labeled as "equipment bias," and is representative of the amount of weight that is provided a specific defect based on the equipment utilized in the subcomponent or asset. For example, equipment that may have a factor into this equipment bias selected by the user may be dependent on the sensors utilized, the subcomponent itself, the asset itself, electrical connections within the asset, or any other equipment, component, or subcomponent utilized in the asset.

A seventh column 413 of the table is labeled as "Activated," and is representative of the specific defects that a user has activated or selected to be diagnosed, determined, or calculated by the risk management system. The specific defect types selected by a user are indicated by a check mark. For example, if there is no check mark, then the specific defect is not activated and will not be utilized in determining a probability of risk of failure of a subcomponent of the asset. Alternatively, if there is a check mark, then the specific defect will be activated and will be utilized in determining a risk of failure of a subcomponent of the asset.

A button 414 labeled as "show unmatched" is provided within the window 400. When clicked by a user, the button 414 opens another window that presents all specific defects and provides their missing inputs. For example, the missing input of "thermal model" of the "overheating—core shorts at edges/burrs" defect may be shown in this window as a missing input for this specific defect. Accordingly, this allows a user to easily see the parameters and inputs that are not being utilized by an algorithm to calculate a probability of risk of failure for a respective specific defect type.

Various benefits of the above and alternative embodiments of the risk management system will now be discussed. For the sake of simplicity and brevity, the benefits will be discussed with respect to the embodiment in FIG. 1. However, some or all of these benefits may apply to alternative embodiments of the risk management system within the scope of the above disclosure.

A benefit of a risk management system as illustrated in FIG. 1 is the ease of setup and use. The setup is relatively easy and simple because any number of sensors can be utilized and coupled to an electrical device 110. For example, a heat or temperature sensor may be coupled to a winding coil of a transformer or other component of electrical device 110 to monitor the heat or temperature level of a subcomponent of the electrical device 110. The sensor data generated by the heat or temperature sensor is then utilized to determine whether the winding coil (in this example) is working within selected parameters or thresholds for preferred or optimum working conditions. Alternatively, other types of sensors, e.g., moisture or humidity sensors, voltage sensors, current sensors, external environment sensors, internal environment sensors, electronic connection sensors, or any other types of sensors for monitoring an electrical device or subcomponents of an electrical device, may be coupled to the electrical device or subcomponents of the electrical device. In addition, the sensors may monitor the working conditions or external environment of the electrical device or subcomponents of the electrical device.

Another benefit of the risk management system shown in FIG. 1 is the ease of use with multiple electrical devices. For example, in the alternative embodiments shown in FIGS. 2 and 3, any number of electrical devices 124, 126, 128, 140, 142 may be monitored at the same time. The electrical devices may be located in many different locations in a building, community, geographic region, or even around the world, and may send data to a server at a single location or several locations as desired to monitor the various electrical devices. The electrical devices may be coupled to each other and work in tandem, or may be distinct electrical devices in different locations that do not work in tandem. For example, sensor data generated from an electrical device in a first country and sensor data generated from another electrical device in a second country may be monitored in a single location in yet another country. Accordingly, any number of electrical devices or electrical device systems, which may be a combination of various electrical devices working in tandem, can be monitored in any location in the world as desired.

Another benefit of the risk management system shown in FIG. 1 is the flexibility of how the electrical devices are coupled to the memory or the processor. For example, in the alternative embodiment of the risk management system shown in FIG. 3, the plurality of sensors are communicatively coupled to the memory, which stores the sensor data and sends the sensor data to the processor for processing. Alternatively, in the embodiment of the risk management device shown in FIG. 1 and the alternative embodiment of the risk management device shown in FIG. 2, the plurality of sensors are communicatively coupled to the processor, which may send sensor data and processed information to the memory for storage and the display.

While these are some of the benefits of the risk management system in FIG. 1, there are and may be several other additional benefits when utilizing the embodiments and other alternative embodiments of the risk management system within the scope of the present disclosure.

A benefit of the method 200 shown in FIG. 4 is the simplicity and adaptability of the method 200. For example, the steps of the method 200 can easily be changed as desired to increase the speed and reduce the amount processing power necessary to complete the required steps. In addition, the processed information and the sensor data may be in any form desired, such as an encoded form, a compressed form, a raw form, or other form as desired for collecting, processing, or storing of data as desired.

Additional benefits are obtained with the user interface described herein, for visually and graphically depicting the sensor data and the processed information as generated by the plurality of sensors and processed by the processor in the risk management system. For the sake of simplicity and brevity, the benefits will be discussed with respect to the embodiment shown in FIG. 5. However, these benefits may apply to each and every embodiment and alternative embodiment of the user interface for visually and graphically depicting the sensor data and the processed information.

For example, the user interface 300 includes a radar chart 310 that helps a user to quickly determine if certain subcomponents 322 of an electrical device being monitored needs to be fixed, replaced, or investigated in closer detail to determine the level of maintenance required. In addition, the radar chart 310 reduces the amount of training required to determine when an electrical device is failing or is in need of maintenance. For example, if the sensor data is instead numerically presented in a spreadsheet format, a user may need extensive training and education in order to interpret the sensor data and determine how the electrical device is failing or why the electrical device is not working within optimum, preferred, or desired parameters. However, when the radar chart 310 is utilized, little to no training is required for a user to determine whether the electrical device or component thereof is in need of maintenance or repair. The shape of the failure profile 314, which may be filled in with a color or other shading, provides a quick visual summary of the state of operation of the electrical device, based on the subcomponents of the electrical device being monitored. By noting the points 324 of the failure profile 314 that project farther outward from the center of the risk radar, a user observing the failure profile 314 can quickly and efficiently identify the subcomponents of the electrical device that warrant further investigation, maintenance, or replacement.

Another benefit of the user interface 300 is that it includes a table that contains defect types in the first column 302, warning percentages in the second column 304, and probabilities of failure in the third column 306 with respect to various factors of the electrical device being monitored. The defect types in the first column 302 allow a user to quickly determine what factor is being determined or calculated by the processor based on the sensor data generated by the plurality of sensors coupled to the electrical device. In addition, the warning percentages in the second column 304 provide an indication of how important the factor is with respect to operation of the electrical device. This allows a user or individual to easily determine that certain factors are more important than other factors when determining what is the cause of failure or need for maintenance in the electrical device. Also, the probabilities of failure in the third column 306, which are risk percentages and are graphically depicted in a bar graph format, allow a user or individual to easily determine the probability of failure in the electrical device due to the corresponding defect type in the first column 302 in the table. With regard to the above discussion, a user can quickly interpret the sensor data generated by a plurality of sensors as processed information processed by a processor to determine how an electrical device is failing and why the electrical device is failing, no matter the user's training or education level.

Another benefit of the user interface 300 is an ease of selecting specific data from a specific location and a specific period of time for further evaluation. The sliding scale interface 308 includes a timeline of sensor data generated by a plurality of sensors with respect to operational characteristics of an electrical device. The sliding scale interface 308 allows for any period of time to be selected by utilizing the sliding scale interface 308 and a selected period of time range 318. This allows the user to easily and quickly select a period of time that will be presented in the radar chart 310 and in columns of the table 302, 304, 306. This also allows the user to quickly select the data that the user would like to be displayed in the radar chart 310 and the table 302, 304, 306, while allowing the user to quickly change the time period and the data presented. This further allows the user to observe trends in the operational characteristics of the electrical device over time. For example, as the user slides the selection interface 318 along the sliding scale interface 308, the shape of the failure profile 314 in the radar chart 310 changes in accordance with the sensor data generated over the selected time. The change of shape of the failure profile 314 over time provides additional insight to the overall operational health of the electrical device that may not otherwise be obtained by looking at simple numerical charts of the sensor data.

Another benefit of the user interface 300 is the ease of determination of points of interest along the sliding scale interface 308. The sliding scale interface 308 includes bar graphs 326 along the timeline that indicate a likelihood of failure in an electrical device. This allows a user to easily determine the data to be visually and graphically depicted in the radar chart 310 and columns of the table 302, 304, 306 to quickly analyze how, why, and when an electrical device is failing or failing to work within optimum conditions or in an optimum manner. Also, the change in height of the bar graphs and color of the bar graphs of the sliding scale interface 308 allow the user to easily and quickly determine when the summed risk of failure of the asset is high, intermediate, or low.

For the sake of simplicity and brevity, benefits are discussed with respect to the embodiment shown in FIG. 6. However, these benefits may apply to each and every embodiment and alternative embodiment of the user interface for selecting parameters to be utilized in calculating probabilities of risks of failure for specific defects in subcomponents and risk scores for respective subcomponents of the asset.

A benefit of the parameter selection window 400 is the ease of determination and selection of parameters to be selected for calculating probabilities of risk of failure for specific defects or defect types, as well as for calculating risk scores for subcomponents of an asset that ultimately indicate overall asset health.

While these are some of the benefits of the user interface for visually and graphically depicting the sensor data or processed information as in FIG. 5, there are and may be several other additional benefits when utilizing the embodiments and other alternative embodiments of the user interface within the scope of the present disclosure.

It is noted that in the preceding description, certain specific details are set forth in order to provide a thorough understanding of various embodiments of the disclosure. However, one skilled in the art will understand that the disclosure may be practiced without these specific details. In other instances, well-known structures associated with electronic components and fabrication techniques have not been described in detail to avoid unnecessarily obscuring the descriptions of the embodiments of the present disclosure.

Unless context requires otherwise, throughout the preceding description and in the claims that follow, the word "comprise" and variations thereof, such as "comprises" and "comprising," are to be construed in an open, inclusive sense, that is, as "including, but not limited to."

The use of ordinals such as first, second, and third herein does not necessarily imply a ranked sense of order, but rather may only distinguish between multiple instances of an act or structure.

Reference throughout the above specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, as used in the above specification and in the appended claims, the singular forms "a," "an," and "the" include plural referents unless the content clearly dictates otherwise. It should also be noted that the term "or" is generally employed in its sense including "and/or" unless the content clearly dictates otherwise.

The various embodiments described above can be combined to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving, by a processor, sensor data from a plurality of sensors positioned relative to at least three subcomponents of a utility asset, wherein the plurality of sensors are configured to detect operational characteristics of the at least three subcomponents of the utility asset and output the sensor data based on the detected operational characteristics;
   calculating, by the processor, two or more probabilities of failure of the utility asset based on the received sensor data;
   determining, by the processor, at least one risk score for each subcomponent of the utility asset based on the calculated two or more probabilities of failure of the utility asset, each respective risk score corresponding to a respective subcomponent of the at least three subcomponents;
   presenting, on a display medium, the two or more probabilities of failure of the utility asset; and
   generating, for presentation on the display medium, a graph that graphically depicts the risk scores for the at least three subcomponents of the utility asset, wherein each risk score is presented at different coordinates within the graph based at least in part on the respective subcomponent for which the risk score was determined and a magnitude of the risk score.

2. The method of claim 1, wherein the graph is a radar chart having a circumferentially defined position for each of the at least three subcomponents of the utility asset, and wherein the risk score for each subcomponent is presented in the graph at coordinates having a distance from a center point of the graph that is based on the magnitude of the respective risk score.

3. The method of claim 1, further comprising:
   generating a timeline for the sensor data received by the processor; and
   selecting a time period using a sliding scale interface that includes the timeline, wherein the sliding scale interface is presented on the display medium and is configured to select a period of time from the timeline over which the sensor data was received by the processor to determine, by the processor, the at least one risk score for each subcomponent of the utility asset and calculate, by the processor, the two or more probabilities of failure based on the sensor data received by the processor during the time period selected, wherein the sliding scale interface is visible within the display medium at the same time the graph that graphically depicts the risk scores is visible within the display medium.

4. The method of claim 1, further comprising:
   selecting two or more weighting factors using a sliding scale interface presented on the display medium, wherein each respective weighting factor of the two or more weighting factors is used when calculating a respective probability of failure of the two or more probabilities of failure.

5. The method of claim 1, further comprising generating, for presentation on the display medium, two or more of bar graphs to display the two or more probabilities of failure, wherein the two or more bar graphs are equal in magnitude to the two or more probabilities of failure.

6. The method of claim 5, wherein the two or more bar graphs are presented in a table, wherein the table containing the two or more bar graphs is visible within the display medium at the same time that graph that graphically depicts the risk scores is visible within the display medium.

7. The method of claim 1, wherein presenting on the display medium the two or more probabilities of failure includes presenting in a table two or more percentages of the two or more probabilities of failure, wherein the two or more percentages are equal in magnitude to the two or more probabilities of failure, and the table containing the two or more percentages is visible on the display medium at the same time the graph is visible on the display medium.

8. The method of claim 1, wherein each probability of failure of the two or more probabilities of failure corresponds to two or more types of defects detected in the utility asset, each respective type of defect of the two or more types of defects corresponding to a respective probability of failure of the two or more probabilities of failure.

9. A risk management device, comprising:
   a processor configured to receive data, calculate two or more probabilities of failure based on the data the processor receives, and determine at least three risk scores based on the probabilities of failure that are calculated by the processor; and
   a display medium coupled to the processor, the display medium is configured to present a graph of the at least three risk scores output by the processor and a table that includes the two or more probabilities of failure output by the processor, wherein the table is adjacent to the graph when presented on the display medium, and the table and the graph are visible on the display medium at the same time.

10. The risk management device of claim 9, wherein two or more bar graphs of the two or more probabilities of failure are presented within the table on the display medium and each respective bar graph of the two or more bar graphs corresponds to a respective probability of failure of the two or more probabilities of failure.

11. The risk management device of claim 9, wherein two or more percentages of the two or more probabilities of failure are presented within the table on the display screen and each respective percentage of the two or more percentages corresponds to a respective probability of failure of the two or more probabilities of failure.

12. The risk management device of claim 9, wherein the graph is a radar chart having a circumferentially defined position for at least three risk scores, and wherein the at least three risk scores are presented in the graph at coordinates having a distance from a center point of the graph that is based on the magnitude of a respective risk score of the at least three risk scores.

13. The risk management device of claim 9, wherein each probability of failure of the two or more probabilities of failure corresponds to a respective type of defect of two or more types of defects that is present within a utility asset.

14. The risk management device of claim 9, further comprises a time index including a selection slider to select a period of time for which the data the processor received during the period of time selected will be utilized to calculate and determine the two or more probabilities of failure and the at least three risk scores are calculated for the period of time selected.

15. A risk management system, including:
a utility asset with at least three subcomponents;
a plurality of sensors coupled to the at least three subcomponents of the utility asset; and
a risk management device coupled to the plurality of sensors, the risk management device is configured to utilize data from the plurality of sensors, the risk management device includes:
a processor configured to receive data from the plurality of sensors, calculate at least two probabilities of failures based on the data received from the plurality of sensors, and determine at least three risk scores based on the at least two probabilities of failures calculated by the processor; and
a screen configured to display the at least two probabilities of failure, a risk radar chart of the at least three risk scores determined from the at least two probabilities of failure, and a time index chart, wherein the at least two probabilities of failure, the risk radar chart, and the time index chart are all visible on the screen at the same time.

16. The risk management system of claim 15, wherein the at least two probabilities of failure are displayed as percentages and bar graphs of at least two types of defects within a table, each type of defect of the two types of defects corresponding to a respective probability of failure of the at least two probabilities of failure.

17. The risk management system of claim 15, wherein the time index chart includes a selection slider and a timeline to select a time period, and wherein the time period selected determines the data utilized by the processor to calculate the at least two probabilities of failure and the at least three risk scores.

18. The risk management system of claim 15, further comprises a memory coupled to the processor of the risk management device, wherein the memory is configured to store the data received by the processor from the plurality of sensors.

19. The risk management system of claim 15, wherein each respective risk score of the at least three risk scores corresponds to a respective subcomponent of the at least three subcomponents.

20. The risk management system of claim 19, wherein each risk score of the number of risk scores is a value between 0 and 100, wherein 0 represents no likelihood of a respective type of defect being present in the respective subcomponent of the at least three subcomponents and 100 represents a complete likelihood of the respective type of defect being present in the respective subcomponent of the at least three subcomponents.

* * * * *